July 7, 1959
H. T. M. RICE
2,893,278
MULTIPLE STAGE, PREDETERMINED TORQUE RELEASE APPARATUS FOR
TIGHTENING THREADED FASTENING ELEMENTS
Filed Oct. 20, 1952
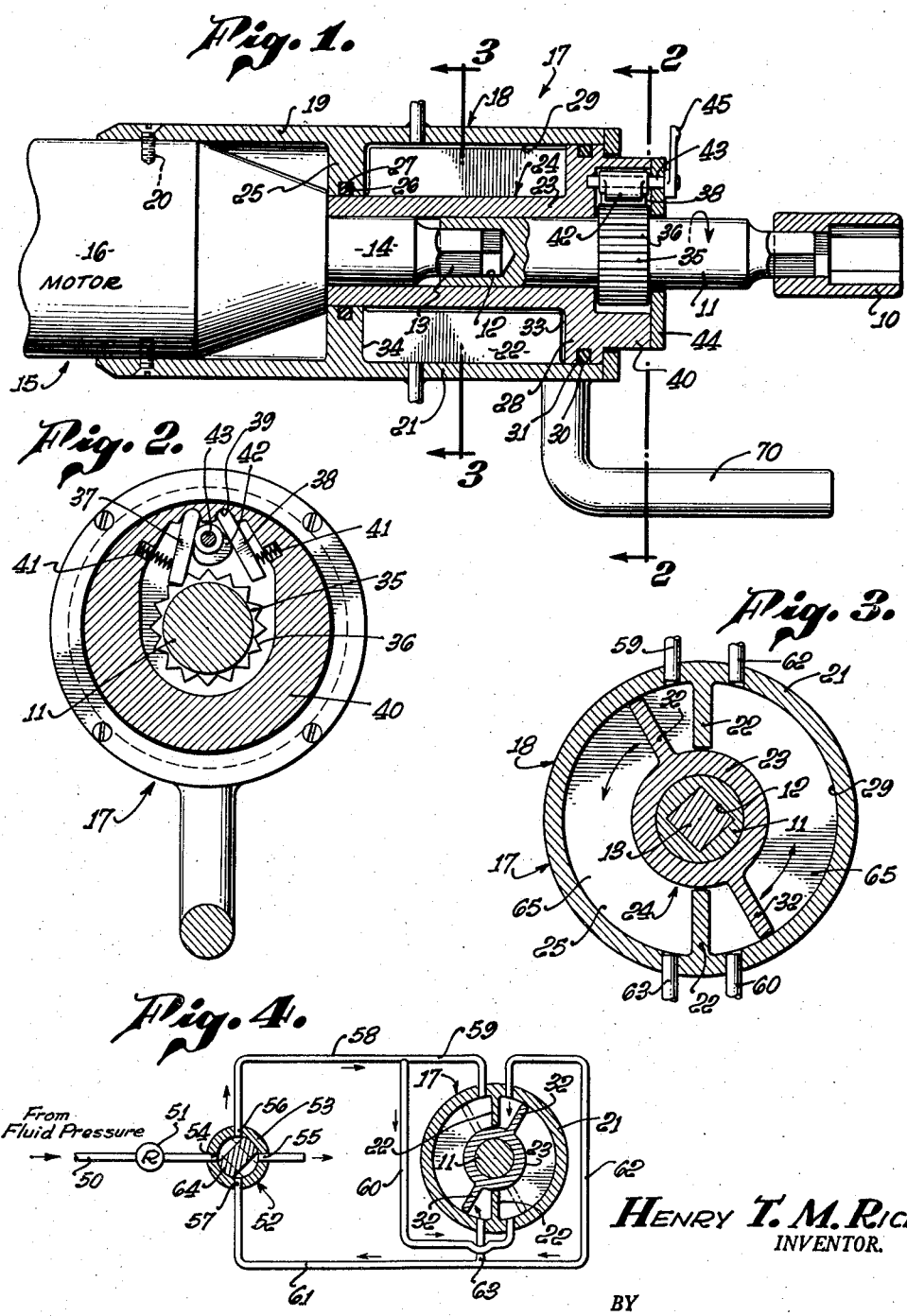
HENRY T. M. RICE,
INVENTOR.
BY
Bernard Kriegel United States Patent Office 2,893,278
Patented July 7, 1959

2,893,278

MULTIPLE STAGE, PREDETERMINED TORQUE RELEASE APPARATUS FOR TIGHTENING THREADED FASTENING ELEMENTS

Henry T. M. Rice, San Gabriel, Calif., assignor, by decree of distribution, to Adele M. Stevens, executrix of the estate of Dillon Stevens, deceased Application October 20, 1952, Serial No. 315,793

12 Claims. (Cl. 81—52.4)

The present invention relates to apparatus for tightening threaded fastening elements to predetermined final torque values.

Apparatus is known for tightening nuts, screws, and similar fastening elements. However, it is difficult to secure the tightening of such elements to the desired extent because of many variable factors encountered. When motorized or power equipment is employed, these factors include inertia forces produced by the comparatively fast speed at which the equipment operates, which results in the storage of a large amount of energy in the equipment, that is transmitted to the threaded fastening element as it encounters resistance in being tightened against the work. The absorption of the energy varies as the resistance varies, which makes it difficult to adjust the apparatus to tighten a plurality of threaded fastening elements accurately and to the same extent.

Accordingly it is an object of the present invention to avoid the presence of relatively high inertia forces in tightening threaded fastening elements to the desired torque by means of power equipment, thereby insuring accuracy in the tightening obtained.

Another object of the invention is to provide an apparatus for tightening threaded fastening elements, which can rapidly rotate the elements to a tightened condition, and in which the inertia forces present during the tightening of an element to the desired torque value are relatively small.

A further object of the invention is to provide an apparatus capable of tightening threaded fastening elements in stages, including a preliminary tightening to a low value, which need not necessarily be accurate, and a final tightening to the desired higher value, which can be accomplished with the absence of appreciable inertia forces, thereby insuring the accuracy of the final tightening.

Yet another object of the invention is to provide apparatus for tightening threaded fastening elements, in which the final torque to bring the element up to the desired degree of tightening is applied slowly, insuring accuracy in the degree of tightening.

Still another object of the invention is to provide apparatus for tightening threaded fastening elements, in which the element is initially rotated by the device to a preliminary degree of tightness against the work, and in which another relatively slow acting mechanism operates through the preliminary tightening device to finally tighten the element with accuracy to the desired torque value.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a longitudinal section, with parts shown in elevation, of one form of apparatus embodying the invention;

Fig. 2 is a cross-section taken along the line 2—2 on Fig. 1;

Fig. 3 is a cross-section taken along the line 3—3 on Fig. 1;

Fig. 4 is a diagrammatic view of a hydraulic system for operating the fluid motor portion of the specific apparatus disclosed.

In its general aspects, the invention contemplates the tightening of a threaded fastening element (not shown) to a torque value that is substantially less than the final torque value required or desired, and then obtaining the final tightening of the threaded fastening element by a power device which operates in a comparatively slow fashion. The initial or preliminary tightening of the threaded fastening element may be obtained in a rapid manner, as through use of any type of mechanism, which need not necessarily possess any substantial degree of accuracy, so long as the mechanism is only capable of tightening the threaded fastening element to a value that is less than the final desired torque. As an example, the preliminary tightening of the threaded fasteners may be accomplished through use of an air, or similar fluid, type of stall motor, an impact wrench, a motorized apparatus, including a releasable clutch which automatically disengages itself when a particular torque is transmitted therethrough, or through a slippable type of friction clutch. When the preliminary degree of tightness is obtained, then the very low inertia apparatus is brought into play, which operates through the particular mechanism for securing the preliminary torque tightness, to effectuate the tightening of the threaded fastening element to the desired final torque. The low inertia motor preferably does not interfere with the operation of the mechanism for securing the preliminary tightness, but can be coupled to a portion of this mechanism for imparting a final torque to the threaded fastening element, whenever desired. The coupling action may take place through a disengageable clutch, such as an overrunning or one-way clutch.

Since the threaded fastening element has been tightened to a preliminary extent, the final tightening is ordinarily accomplished through turning the threaded fastening element only a fraction of a revolution. For that reason, the motor for effectuating the final tightening need only be effective to rotate the threaded fastening element a partial revolution, and, since this motor preferably starts from rest, there is insufficient time for this motor to accelerate to a speed that would introduce inertia forces that would be imposed upon the threaded fastening element, and introduce a substantial factor that must be considered in obtaining accurate tightening of the element against the work.

As specifically illustrated in the drawing, a wrench socket 10 is suitably secured to the forward end of a spindle 11, forming part of the apparatus for tightening a nut. If a screw were to be tightened, then the wrench socket would be replaced by a screw bit. The spindle 11 extends in a rearward direction from the socket, and has a rearward non-circular socket 12 encompassing a companion non-circular end 13 of a driven shaft 14, that may form a portion of any suitable type of device 15 for imparting rotation to it, as well as to the spindle 11 and wrench socket 10, so as to rotate the threaded fastening element. This driven shaft 14 extends from the housing 16, of the preliminary tightening device 15.

Assuming that the preliminary tightening device 15 is motorized equipment, it can rotate its driven shaft 14, the spindle 11 and socket 10, to rotate the threaded fastening element in a rapid manner to the preliminary torque tightness. This preliminary torque need not be of any particular fixed amount, so long as it is less than the final torque tightness of the threaded fastening element.

A motor 17 is provided for action upon a portion of the preliminary torque tightening device, such as the spindle 11, to impart the final torque thereto. This motor is shown as being of the fluid type in the drawings, and includes a housing 18 having a rearward extension 19 encompassing the housing 16 of the preliminary tightening device 15, and to which it is secured in any suitable manner, as through use of screws 20. The forward portion of the motor constitutes a fractional revolution fluid motor 17, including a stationary outer casing or stator 21, having a plurality of diametrically opposed stationary radial vanes 22 extending inwardly to an elongate hub portion 23 of the partial revolution rotor 24 of the motor, which is rotatably mounted upon the spindle 11 and the driven shaft 14 of the preliminary tightening device.

The rear portion of the hub 23 extends snugly through a rear partition 25 of the casing, leakage in a rearward direction between the hub and partition being prevented by a suitable seal ring 26, such as a rubber O-ring, contained within a groove 27 in the partition 25 and bearing against the periphery of the hub 23. The forward portion of the rotor terminates in an outwardly directed flange 28 extending towards the cylindrical wall 29 of the casing 21. Leakage of fluid in a forward direction between the casing and flange is prevented by a suitable seal ring 30, such as a rubber O-ring, contained in a peripheral groove 31 in the flange 28 and engaging the inner cylindrical wall 29 of the casing.

The rotor 24 of the fluid motor has a pair of diametrically opposed movable radial vanes 32 extending therefrom to the inner wall 29 of the casing 21. The outer ends of the movable vanes 32 preferably make a sliding fit with the wall 29 of the casing, whereas the inner ends of the stationary vanes 22 preferably make a sliding fit with the periphery of the hub 23. The stationary vanes 22 extend from the casing partition 25 in a forward direction toward the rotor flange 28, the forward ends of the vanes slidably engaging the rear face 33 of the flange. Similarly, the movable vanes 32 are integral with the flange 28 and extend in a rearward direction to the partition 25, their rearward ends making a sliding fit with the forward face 34 of this partition. Because of the sliding fits of the stationary vanes 22 with portions of the rotor 24, and of the movable vanes 32 with portions of the housing 18, substantial fluid leakage past the vanes is precluded.

The rotor 24 may impart its arcuate, or rotary, motion to the spindle 11 through a suitable coupling, which is preferably in the form of a one-way or overrunning clutch. Thus, the spindle 11 has a ratchet wheel 35 integral therewith, or otherwise suitably secured thereto, the ratchet teeth 36 being engageable by one or more pawls 37, 38 carried by the rotor. As disclosed, the rotor 24 may be caused to actuate the spindle 11 in both a forward and reverse direction, and for that reason, both a forward acting pawl 37 and a rearward acting pawl 38 are provided. The pawls 37, 38 have their outer ends receivable within sockets 39 in a forward extension 40 of the rotor, the inner ends of the pawls being engageable with the ratchet teeth 36 to effect a coupling between the rotor 24 and the ratchet 35. The pawls are urged toward a position of engagement with the ratchet teeth by suitable compression springs 41 bearing against the inner ends of the pawls and against the rotor portion 40 itself.

It is to be noted that the pawls 37, 38 are disposed on opposite sides of a central plane through the axis of the spindle 11. When one of the pawls is permitted to engage the ratchet teeth, it will transmit rotation between the rotor and the spindle in one direction. When the other pawl is permitted to engage the ratchet teeth, it will transmit rotation between the rotor and the spindle in the opposite direction. Only one of the pawls 37, 38 is allowed to engage the ratchet teeth 36 at any one time, and such action is determined by a suitable reversing mechanism. As specifically disclosed, this mechanism includes a radial cam 42, which is secured to a shaft 43 pivotally mounted in the rotor 24 and an end plate 44 secured to the rotor in any suitable manner. This shaft 43 extends forwardly through the end plate 44 and has an actuating lever 45 secured thereto. When the lever has been shifted to one position, then one of the pawls 38 is held out of engagement from the ratchet teeth 36, whereas the other pawl 37 is allowed to engage the ratchet teeth. Accordingly, rotation may be transmitted from the rotor 24 to the spindle 11 when the rotor is actuated in one direction, as in the counter-clockwise direction disclosed in Fig. 2. If the lever 45 is shifted to cause the cam 42 to engage and urge the pawl 37 out of engagement with the ratchet teeth, and allow the spring 41 to engage the other pawl 38 with the ratchet teeth, then clockwise rotation will be transmitted between the rotor 24 and the spindle 11, as seen in Fig. 2. Regardless of which pawl is allowed to engage the ratchet teeth, the pawl will not interfere with the ability of the ratchet 35 to be rotated by the driven shaft 14, since the rotation of the driven shaft and spindle in one direction, as in the counter-clockwise direction disclosed in Fig. 2, will merely displace the pawl laterally out of engagement with the teeth 36 against the force of its spring 41.

The fluid motor may be actuated a partial revolution in either direction by a suitable fluid medium, such as air or oil under pressure. The fluid under pressure may be supplied from a suitable source, and will pass through the line 50, and through a pressure regulating valve 51 to a four-way valve 52, which will determine the flow of fluid to one side of the stationary vanes 22, or to the other. This four-way valve is of a conventional type, and includes a housing 53 having an intake port 54 and an exhaust port 55. Disposed substantially at ninety degrees to these aligned ports 54, 55 are two other ports 56, 57, one of which communicates with a line 58 that merges into two branches 59, 60. One of the branches 59 communicates with the fluid motor casing 21 immediately to one side of one of the stationary vanes 22, and the other branch 60 communicates with the casing 21 immediately adjacent the other stationary vane 22, and on the same side thereof as the other vane, looking arcuately around the stationary casing 21. Another fluid line 61 extends from the other port 57 of the four-way valve 52, and merges into a pair of branches 62, 63 that enter the fluid motor casing 21 on the opposite sides of the stationary vanes 22, and immediately adjacent thereto.

A movable valve member 64 is disposed in the valve body 53. When located in the full line position shown in Fig. 4, fluid under pressure will be allowed to pass through the line 58, and its branches 59, 60, into the casing chamber 21 immediately adjacent the stationary vanes 22 in a counter-clockwise direction. This fluid under pressure will act upon the movable radial vanes 32 and rotate the rotor 24 in a counter-clockwise direction, as seen in Figs. 2 and 3, causing the pawl 37 to engage the ratchet 35 and rotate the spindle 11 in the counter-clockwise direction. The chamber spaces 65 on the other side of the movable vanes 32 can have any fluid therein bled, or exhausted, through the outer branches 62, 63 and line 61 into the valve housing 53, and out through the exhaust port 55. The fluid under pressure can shift the rotor 24 to the full line position shown in Fig. 4.

If the movable valve member 64 is shifted to the dotted line position disclosed in Fig. 4, then the operation of the partial revolution motor is reversed. Fluid under pressure will then enter the line 61 and its branches 62, 63, flowing into the chamber 65 on the opposite side of the stationary vanes 22, acting on the movable vanes 32 to shift them in a clockwise direction, as seen in Figs. 2, 3 and 4, rotating the rotor 24 in a clockwise direction, and returning the movable vanes 32 to the position first described, or as disclosed in full lines in Fig. 3 and broken lines in Fig. 4. Of course, during such reverse movement, the driving pawl 37 will merely ratchet freely over the ratchet wheel 35.

The position of the four-way valve 52, disclosed in dotted lines in Fig. 4, is also used in the event it is desired to reversely rotate the spindle 11. When this takes place, the pawl reversing lever 45 is manipulated, so that the cam 42 holds the pawl 37 out of engagement with the ratchet teeth 36, allowing the spring 41 to shift the other pawl 38 into engagement with the ratchet teeth.

In the use of the device, the wrench socket 10 is placed upon a nut (not shown), and the preliminary tightening device 15 is caused to rotate, its driven shaft 14 driving the spindle 11 and the wrench socket 10, to tighten the threaded fastening element to a preliminary torque value. This torque will be determined by the adjusted capacity of the preliminary tightening device 15. If this is a stall motor, then the tightening will occur until the device stalls. If it embodies a releasable clutch, then the transmission of a predetermined torque through the clutch will cause it to automatically release, and interrupt the drive to the driven shaft spindle 11, socket 10 and threaded fastening element. It is immaterial what type of preliminary tightening device is used, nor is its speed of operation of importance, so long as it does not tighten the threaded fastening element to the final desired torque value or above. During the rotation of the driven shaft 14 and spindle 11, the fluid motor 17 is ineffective, inasmuch as the ratchet 35 will move freely past the power pawl 37 or 38 that is being used, such as the pawl 37 illustrated in Fig. 2.

When the threaded fastening element stops turning, the operator actuates the four-way valve, which may be moved to the full line position shown in Fig. 4, in order that fluid under pressure can enter the fluid motor housing 21, to act upon the movable radial vanes 32 that are initially located adjacent the stationary vanes 22. The regulator valve 51 will have been adjusted to provide the desired pressure to the casing chamber 21 for action upon the movable vanes, and this pressure will shift the vanes 32 arcuately, the motion being transmitted through the pawl 37 to the ratchet 35, spindle 11 and wrench socket 10, and from the socket to the threaded fastening element. Inasmuch as the threaded fastening element has been preliminarily tightened, only a comparatively small arcuate movement should be necessary to tighten it to the predetermined extent, determined by the pressure of the fluid acting upon the movable vanes 32. This fluid motor 17 is of the stall type, the threaded fastening element being tightened until the fluid pressure is incapable of moving the vanes 32 to any further extent.

When the threaded fastening element ceases any further turning, the operator reverses the four-way valve 52, causing fluid under pressure to pass to the other side of the stationary vanes 22 and act upon the opposite faces of the radial vanes, returning the latter to their initial position.

Of course, if the threaded fastening element is to be rotated in the opposite direction, as might be the case if its threads are left-hand, then the reversing lever 45 will be actuated, to cause the cam 42 to hold the first-mentioned power pawl 37 out of engagement from the ratchet 35, and allow the other pawl 38 to engage the ratchet teeth 36. The four-way valve 52 can be properly manipulated, so that air under pressure first acts upon the opposite faces of the movable vanes 32, the rotation imparted to the rotor 24 being transmitted through the pawl 38 to the ratchet 35 in the opposite direction, to turn the spindle 11, socket 10 and threaded fastening element in such opposite direcion. When the threaded fastening element has been tightened to the predetermined extent, then the four-way valve 52 can be reversed, to return the movable radial vanes 32 to their initial positions adjacent the stationary vanes 22.

A reaction arm 70 may be secured to the fluid motor housing 21 and may be caused to rest against some convenient stationary member, such as the work itself. The engagement of the reaction arm 70 with the stationary member releases the operator of the reaction torque incident to the use of the apparatus. The fluid pressure acting on the stationary vanes 22 is transmitted to the stationary housing 21, tending to reversely rotate it, but such reverse rotation is prevented by engagement of the reaction arm with some stationary member (not shown).

It is, accordingly, apparent that an apparatus has been provided that practically eliminates the presence of inertia forces in tightening the threaded fastening element to its desired ultimate torque. A high speed preliminary tightening can take place if desired, since the preliminary tightening device 15 is only effective to partially tighten the threaded fastening element. No accuracy is required in obtaining this preliminary tightening, so long as it is of a substantially lesser extent than the final torque tightness desired. For that reason, the preliminary tightening device 15 may have a smaller capacity, because the preliminary or initial torque tightness required is substantially lower than the final torque tightness. Despite the smaller capacity of the preliminary tightening device 15, it can be made to operate at high speeds, storing a large amount of energy, which is imparted to the threaded fastening element. However, the inaccuracies associated with the storage of the kinetic energy is of no importance, since the final tightening is provided by the partial revolution fluid motor 17.

After the preliminary tightening has taken place, the delivery of fluid under pressure to the partial revolution fluid motor 17 moves it in a relatively slow fashion through only a few degrees of arc. Such slow motion still does not consume any substantial time, since the distance to be traversed is very small. The moving parts of the device 17 are, therefore, incapable of acquiring any substantial velocity, so that the bringing of the fluid motor 17 to a stalled position, when the threaded fastening element has been tightened to an extent corresponding to the fluid pressure, is not associated with any appreciable kinetic energy that is suddenly absorbed by the stoppage of the threaded fastening element. For that reason, the torque transmitted to the threaded fastening element can be very accurately preselected, since it will correspond very closely to the pressure of the fluid passing into the device, and this pressure is readily controlled by appropriate adjustment of the regulating valve 51.

The accuracy of performing the torque tightening in stages is not only due to the absence of inertia forces, but is also due to the absence of any vibration imparted to the parts during the final tightening. In addition, the torque output is accurate because the slow final rotation of the threaded fastening element does not produce heating or galling of its threads, and that of the companion element to which it is threaded. The absence of this heating also minimizes "relaxation" of the threaded fastening element and its associated parts, resulting from temperature changes, as well as from the intrusion of any lubricant film that is present, and the inclusion of entrapped fluids and solids that are on the parts, such as air, dirt, paint, etc. The slow rotation of the final torque tightening device 17 also renders the apparatus free from prime mover impulses, which contributes to the accuracy of the final torque tightening of the threaded fastening element.

With the use of the device, the threaded fastening element will still be tightened in a rapid manner, inasmuch as the preliminary tightening device 15 still runs the threaded fastening element down and tightens it partially in a rapid manner. The partial revolution motor 17 only comes into play when the final tightening is required, and this is readily accomplished by appropriately manipulating the four-way valve 52 and allowing fluid under pressure to enter the fluid motor at the desired time. The fact that the rotor 24 need only travel a partial revolution to accomplish the final tightening obviously only takes a very short period of time in the accomplishment of the final tightening of the threaded fastening element.

The inventor claims:

1. In apparatus for tightening a threaded fastening element: a device having a torque transmitting capacity less than the torque required and adapted to tighten the element to a torque value lower than a desired higher torque value; a fluid motor having a greater torque transmitting capacity than said device and connected to said device for tightening the element to the desired higher torque value; and means for reversing the direction of operation of said fluid motor.

2. In apparatus for tightening a threaded fastening element: a device having a torque transmitting capacity less than the torque required and adapted to tighten the element to a torque value lower than a desired higher torque value; a fluid motor having a greater torque transmitting capacity than said device and including a stator and a rotor capable of rotating only a partial revolution with respect to said stator; means operatively connecting said rotor to said device to tighten the element to the desired higher torque value; and means for feeding fluid under pressure to said fluid motor to actuate said rotor with respect to said stator.

3. In apparatus for tightening a threaded fastening element: a device having a torque transmitting capacity less than the torque required and adapted to tighten the element to a torque value lower than a desired higher torque value; a fluid motor having a greater torque transmitting capacity than said device and including a stator and a rotor capable of rotating only a partial revolution with respect to said stator; means including an overrunning clutch operatively connecting said rotor to said device to tighten the element to the desired higher torque value; and means for feeding fluid under pressure to said fluid motor to actuate said rotor with respect to said stator.

4. In apparatus for tightening a threaded fastening element: a device having a torque transmitting capacity less than the torque required and adapted to tighten the element to a torque value lower than a desired higher torque value and including a driven shaft; a fluid motor having a greater torque transmitting capacity than said device and including a stator and a rotor surrounding said shaft; means including an overrunning clutch for transmitting the motion of said rotor to said shaft without interfering with the rotation of said shaft by said device; and means for feeding fluid under pressure to said fluid motor to actuate said rotor with respect to said stator to rotate said shaft and tighten the element to the higher torque value.

5. In apparatus for tightening a threaded fastening element: a device having a torque transmitting capacity less than the torque required and adapted to tighten the element to a torque value lower than a desired higher torque value and including a driven shaft; a fluid motor having a greater torque transmitting capacity than said device and including a stator and a rotor surrounding said shaft; said rotor and stator having generally radially extending vanes; means for feeding fluid under pressure to said fluid motor for action on said vanes to shift said rotor arcuately with respect to said stator; and means including a releasable clutch for transmitting the motion of said rotor to said shaft.

6. In apparatus for tightening a threaded fastening element: a device having a torque transmitting capacity less than the torque required and adapted to tighten the element to a torque value lower than a desired higher torque value; and a rotary motor capable of rotating a partial revolution only and having a greater torque transmitting capacity than said device and connected to said device for tightening the element to the desired higher torque value.

7. In apparatus for tightening a threaded fastening element: a device having a torque transmitting capacity less than the torque required and adapted to tighten the element to a torque value lower than a desired higher torque value; a rotary motor capable of rotating a partial revolution only and having a greater torque transmitting capacity than said device for tightening the element to the desired higher torque value; and means including an overrunning clutch drivably connecting said motor to said device.

8. In apparatus for tightening a threaded fastening element: a device having a torque transmitting capacity less than the torque required and adapted to tighten the element to a torque value lower than a desired higher torque value; a rotary fluid motor having a greater torque transmitting capacity than said device and including a stator and a rotor capable of rotating only a partial revolution with respect to said stator; means operatively connecting said rotor to said device to tighten the element to the desired higher torque value; means for feeding fluid under pressure to said fluid motor to actuate said rotor with respect to said stator in one direction; and means for effecting actuation of said rotor in the opposite direction.

9. In apparatus for tightening a threaded fastening element: a member adapted to be coupled to the threaded fastening element; a first device having a torque transmitting capacity less than the torque required and adapted to rotate said member to tighten the element to a torque value lower than the torque required; and a second device having a greater torque transmitting capacity than said first device and connected to said first device to rotate said member and tighten the element to the desired higher torque value; said second device including means surrounding said first device and drivably connected to said first device.

10. In apparatus for tightening a threaded fastening element: a member adapted to be coupled to the threaded fastening element; a first device having a torque transmitting less than the torque required and adapted to rotate said member to tighten the element to a torque value lower than the torque required; a second device having a greater torque transmitting capacity than said first device and connected to said first device to rotate said member and tighten the element to the desired higher torque value; said second device including means surrounding said first device and drivably connected to said first device; and means including an overrunning clutch interconnecting said first and second devices to enable said first device to rotate in a direction to tighten the element without rotating said second device.

11. In apparatus for tightening a threaded fastening element: a member adapted to be coupled to the threaded fastening element; a device having a torque transmitting capacity less than the torque required and adapted to rotate said member to tighten the element to a torque value less than the torque required; and a fluid motor having a greater torque transmitting capacity than said device and connected to said device to rotate said member and tighten the element to the desired higher torque value; said fluid motor including means surrounding said device and drivably connected to said device.

12. In apparatus for tightening a threaded fastening element: a member adapted to be coupled to the threaded fastening element; a device having a torque transmitting capacity less than the torque required and adapted to rotate said member to tighten the element to a torque value less than the torque required; a fluid motor having a greater torque transmitting capacity than said device and connected to said device to rotate said member and tighten the element to the desired higher torque value; said fluid motor including means surrounding said device and drivably connected to said device; and means including an overrunning clutch drivably connecting said fluid motor to said device to enable said device to rotate in a direction to tighten the element without rotating said fluid motor.

References Cited in the file of this patent

UNITED STATES PATENTS

| | | |
|---|---|---|
| 1,160,648 | Peck | Nov. 16, 1915 |
| 1,812,816 | Weaver | June 30, 1931 |
| 1,951,875 | Laabs | Mar. 20, 1934 |
| 2,164,876 | Horlacher | July 4, 1939 |
| 2,202,402 | Rueb | May 28, 1940 |
| 2,292,146 | Meunier | Aug. 4, 1942 |
| 2,457,969 | Anderson | Jan. 4, 1949 |
| 2,484,364 | Whitledge | Oct. 11, 1949 |
| 2,569,244 | Larson | Sept. 25, 1951 |
| 2,691,314 | Stevens et al. | Oct. 12, 1954 |
| 2,702,489 | Wallace | Feb. 22, 1955 |